United States Patent

Abramov et al.

[11] Patent Number: 4,501,549
[45] Date of Patent: Feb. 26, 1985

[54] INJECTION MOLD WITH REPLACABLE INSERT IN MOLD CAVITY OUTLET OPENING

[76] Inventors: Vsevolod V. Abramov, Poklonnaya ulitsa, 6, kv. 4; Vsevolod V. Kuznetsov, Komsomolsky prospekt, 38/16, kv. 92; Alexandr V. Veselov, ulitsa K. Marxa, 21/4, kv. 20; Vitaly S. Tkhai, ulitsa Veshnyakovskaya, 25/2, kv. 227, all of Moscow; Nikolai I. Rysin, Moskovskaya oblast, ulitsa Kirova, 22, korpus 1, kv. 27, gorod Solntsevo; Vasily I. Gerasimov, Derbenevskayanaberezhnaya, 1/2, kv. 81, Moscow, all of U.S.S.R.

[21] Appl. No.: 593,630

[22] Filed: Mar. 26, 1984

Related U.S. Application Data

[62] Division of Ser. No. 370,739, Oct. 2, 1981, Pat. No. 4,439,390.

[51] Int. Cl.³ .......................... B29F 1/022; B29C 1/00
[52] U.S. Cl. .................................................... 425/542
[58] Field of Search ............... 425/542, 549, 572, 577, 425/588, 548, 547, 182, 183, 548, 190

[56] References Cited

U.S. PATENT DOCUMENTS 2,227,263 12/1940 Knowles .......................... 425/190

FOREIGN PATENT DOCUMENTS 3030263 2/1982 Fed. Rep. of Germany ...... 425/190
0106763 9/1978 Japan ................................. 425/190

Primary Examiner—Willard E. Hoag
Attorney, Agent, or Firm—Burgess, Ryan & Wayne

[57] ABSTRACT

Injection molding apparatus is disclosed including a two cavity split-mold with a flow passage between the cavities. The sprue channel is heated as is the flow passage between the mold cavities. The apparatus has a rotatable core with a longitudinal recess. The flow passage has replaceable inserts for varying the size of the flow passage.

4 Claims, 6 Drawing Figures

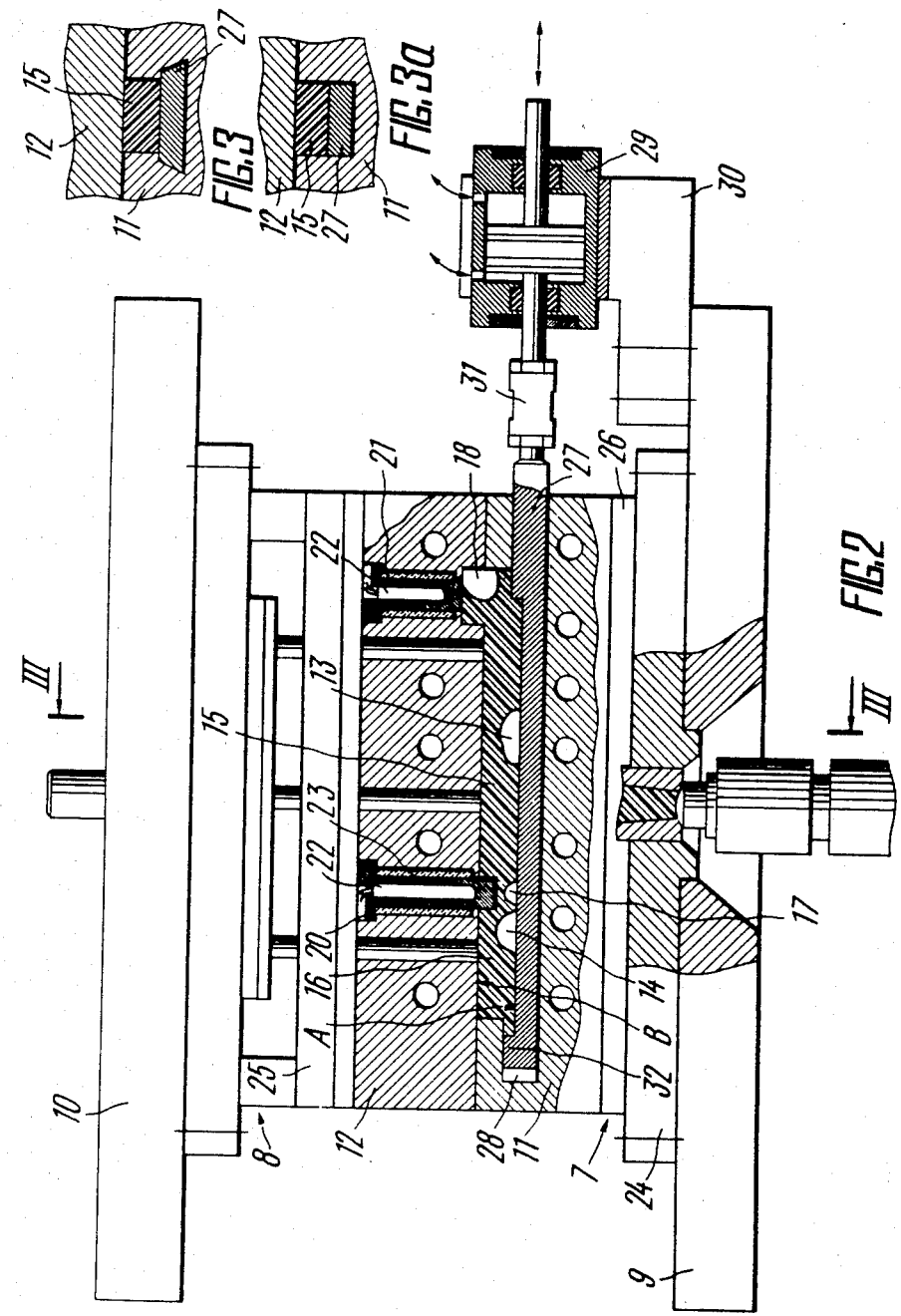

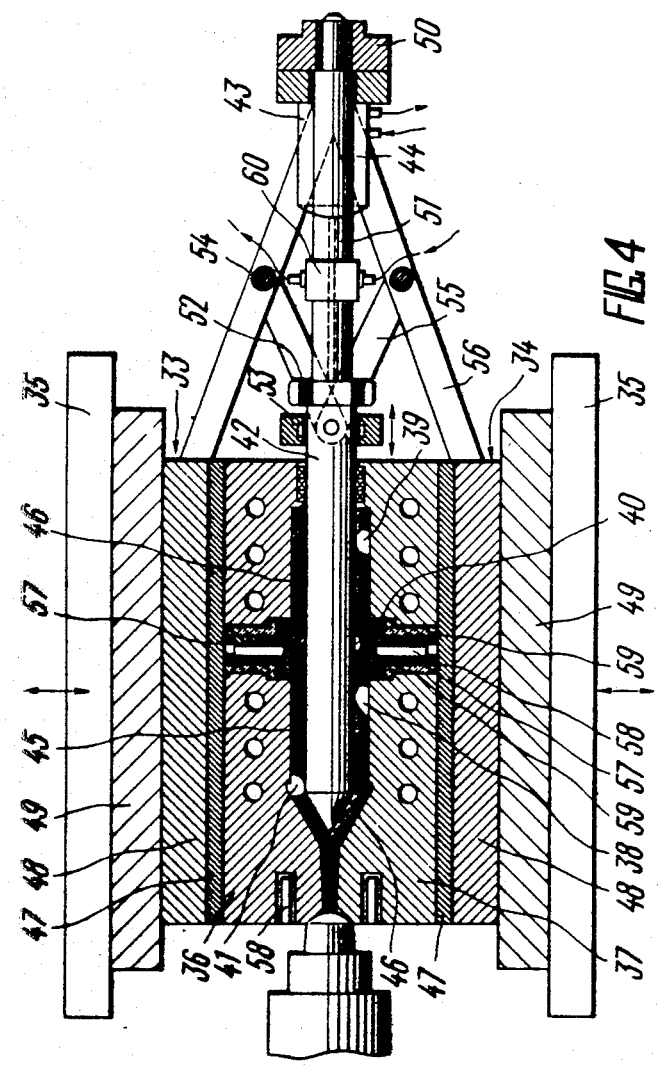

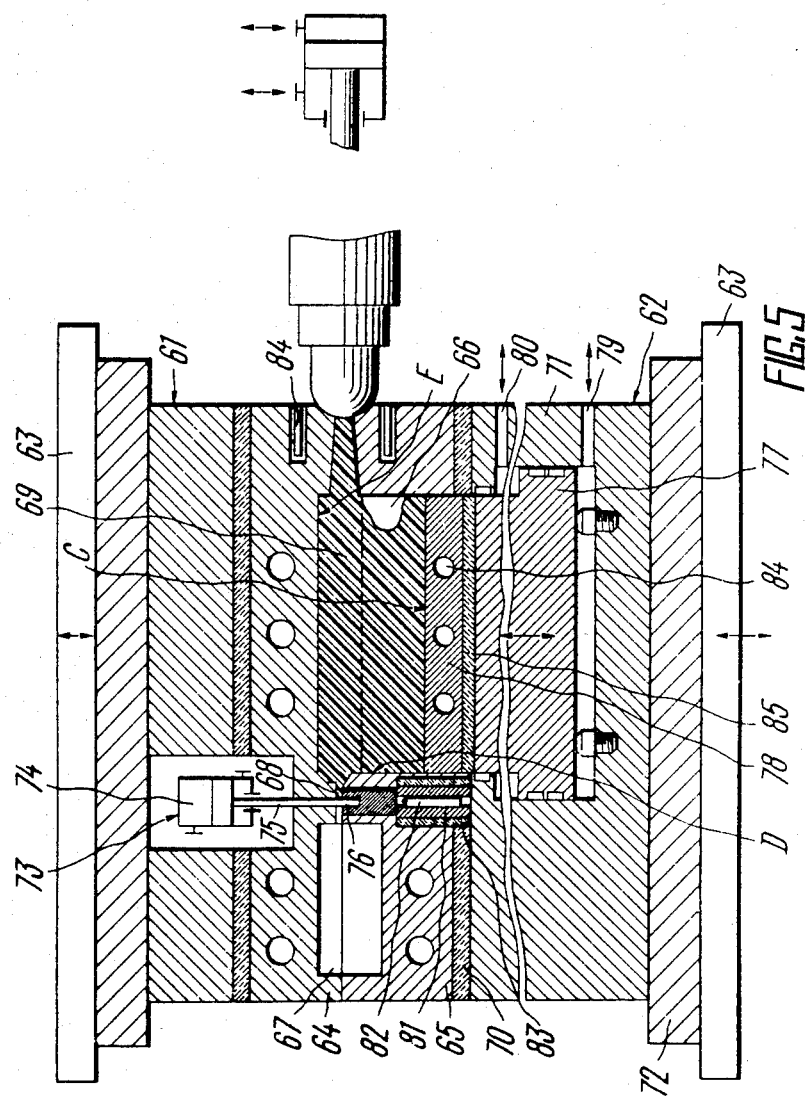

INJECTION MOLD WITH REPLACABLE INSERT IN MOLD CAVITY OUTLET OPENING

This is a division of application Ser. No. 370,739, filed Oct. 2, 1981, now U.S. Pat. No. 4,439,390.

The present invention relates to a process of injection molding of thermoplastics and a split mold for carrying this process into effect.

FIELD OF THE INVENTION

The invention is applicable for use in the machine-building industry and other branches of industry engaged in the manufacture of high-strength textured items from thermoplastic materials.

DESCRIPTION OF THE PRIOR ART

U.S. Pat. No. 3,374,304 discloses a process for injection molding of thermoplastics, according to which a polymer melt is fed under pressure through a gating system into the mold cavities arranged in parallel relationship with one another, whereupon the melt is held under pressure and then cooled. A first portion of the melt is initially forced into the first cavity of the mold to be cooled therein, then into the core of the molding being cooled in the first cavity, while a second portion of the melt is concurrently injected into the second cavity of the mold. The primary object of the process in question is to compensate for the shrinkage of the molding material by injection of the first and second portions of the melt, during which the outer layers of the molding drawn-in during cooling toward the center after the first injection, are pressed out toward the forming surface of the mold.

However, it is possible to carry out the injection of the melt only in a case where the mold cavities are designed for forming sufficiently thick items, for example, over 4 mm in thickness. It is necessary that the melt temperature should exceed by more than 50° C. the polymer initial melting or yield temperature, and should exceed the mold temperature by not less than 60° C.

In the prior-art process, the mold cavity is filled periodically during repeated injections of the melt. In the period between injection cycles, the structural elements in the mold cavities are disoriented due to relaxation and isotropic structure is formed in the solidified layers of the preceding portion of the melt, whereas the oriented structure is produced at the boundary between the preceding and succeeding portions of the material. As a result, the molding has heterogeneous and poorly oriented structure in cross section, which renders impossible the production of moldings with good strength properties. It is common knowledge that the polymers with non-oriented structures have, as a rule, low strength characteristics. For example, for various grades of high-density polyethylene, the yield point is 220 to 260 kgf/cm$^2$, and the ultimate strength is 200 to 230 kgf/cm$^2$.

There is also known a process for injection molding of thermoplastics, which comprises feeding a polymer melt under pressure through a gating system into the mold cavities intercommunicating through openings. According to this process, a single mold can be used for the production of an item made up of two or more concentrically arranged parts (see, for example, French Pat. No. 1,165,678 and Germany, Federal Republic of, laid-open Application No. 2,030,701 cl. 39a 41/00, 1971).

The above-mentioned process allows for the production of moldings having superior strength characteristics as compared to those manufactured in accordance with U.S. Pat. No. 3,374,304. This can be explained by the fact that with the mold cavities being arranged in series the time during which the material in the first cavity is displaced during its flow tends to increase, this being the reason for incomplete orientation processes which occur under given temperature conditions of the process.

However, the production techniques described above are primarily designed to improve quality of series-arranged items or parts of the same item made in a single mold, while the problems of improving strength characteristics of the molding material are neither posed nor solved. To this end, the melt and the mold are brought to high temperatures. For example, for high-density polyethylene, the temperature is 240° C. and 90° C., respectively. It has been found that the above-mentioned temperature conditions of the process tend to increase the polymer chain mobility and, consequently, decrease the amount of oriented structural elements throughout the volume of the molding being produced.

It is an object of the present invention to provide a process for injection molding of thermoplastics, which will make it possible to substantially improve strength characteristics of thermoplastic materials, for example, to increase tensile strength thereof 2 to 3 times by creating appropriate conditions for directionally oriented structure to take place over the entire volume of the molding material.

Another object of the invention is to provide a split mold for carrying out this process.

These and other objects of the invention are accomplished by the provision of a process for injection molding of thermoplastics, comprising the steps of successively filling intercommunicating cavities of a split mold with a polymer melt, holding the latter under pressure and cooling the melt, wherein, after filling the cavities with the polymer melt and in the course of holding the latter under pressure and its cooling, the melt is forced through the mold cavities at a temperature not exceeding the polymer melting or yield temperature by not more than 40° to 50°, and under a pressure of 900 to 3,000 kgf/cm$^2$ until the polymer acquires a solid state throughout the volume of a thermoplastic article being produced, the mold surfaces being cooled within the temperature range starting from $-20°$ C. and ending with the polymer initial melting or yield temperature, and wherein with an increase in pressure, the flow area of the outlet openings of the cavities is decreased and the temperature of the mold surfaces is raised within the aforeindicated temperature range.

As the polymer melt is forced through the mold cavities under a pressure of 900 to 1,400 kgf/cm$^2$, the mold surfaces are preferably cooled down to a temperature ranging from $-20°$ C. to $+60°$ C.

Moreover, the hot melt is preferably subjected to additional heating at the places of its transition from one cavity to another.

In the course of pressing the melt through the cavities, at least one of the mold surfaces of a split mold is preferably displaced by force in the direction of the polymer flow until the polymer acquires a solid state throughout the volume of the molding being produced.

In addition, the polymer melt can be forced through the cavities by bringing together the forming surfaces of a split mold, with the dimension of the prefilled mold cavities being 1.5 to 3 times that of a finished item, while an excessive amount of the material is concurrently pressed out; the mold surfaces are brought together before the polymer acquires a solid state throughout the volume of the item being produced.

According to the invention, the polymer melt is forced through the cavities of the split mold with the ratio of the inlet opening flow area to the maximum distance between the mold surfaces being 0.2 to 4, and with the ratio of the outlet opening flow area to the cavity cross-section at the place of minimum distance between the mold surfaces in the direction normal to the polymer flow being 0.01 to 1.

It has been found that the process of crystallization proceeding in the articles produced in accordance with the injection molding technique of the invention is accompanied by the formation of extended-chain crystallites in polymers, which, by virtue of their chemical composition, are capable of crystallizing; or else, an ordered molecular orientation may take place in non-crystallizable thermoplastics due to the macromolecular extension occurring at the solid polymer-melt interface when the cavity is filled with the melt or in the course of shear at high stresses brought about by high pressures and low velocities of the flow at a time when the polymer melt is continuously forced through the mold cavities and the heated section through which the polymer melt passes on its way to the next cavity, as well as due to forced rotation of one of the forming surfaces until complete solidification takes place throughout the volume of the molding material.

In this way it becomes possible to improve strength properties of thermoplastic materials.

Furthermore, strength properties of the molding produced by the process of the invention are ensured by a uniform distribution of the external force over the solidification front and due to the formation of molecular and permolecular structure of the material, which is homogeneous over the molding cross-section and displays a maximum elongation in the direction of molding.

The process of the invention is preferably carried into effect by means of a split mold made up of two half-molds having coolant supply passages, said half-molds being mounted on plates of an injection-molding machine and carrying respectively a die and a force plunger, the forming surfaces of which define cavities with the halfmolds brought together, said cavities communicating with one another and with a gating system through inlet and outlet openings, wherein, according to the invention, conventional heaters are mounted in the die and in the plunger and located at the inlet and outlet openings in isolation from the remaining part of each half-mold, and wherein replaceable inserts are also provided at the inlet openings to alter the flow area of these openings.

It is preferable that the die cavity, at least the first as viewed in the direction of the polymer flow, be formed with a channel extending throughout its length and opened from the side of the cavity to receive an elongated rod member having a projection on its free end mounted therein for reciprocation, the rod member having its external surface, presented to the cavity, functioning as a forming surface with a longitudinally extending depression provided therein.

Where hollow moldings are to be produced, a power-driven forming mandrel is preferably mounted for rotation in the cavities of each half-mold in coaxial arrangement therewith, the mandrel carrying a movable thrust member connected with the half-molds by means of a lever mechanism.

The split mold may be variously otherwise embodied such that at least one of the forming surfaces of a die or a plunger is made movable in the direction of another surface so as to alter the volume of the cavity they form by means of a plunger incorporated in a power cylinder mounted in one of the half-molds, with a valve device of any conventional type being arranged in close proximity with the outlet opening to close the latter when required.

The invention will now be described, by way of example only, with reference to the accompanying drawings, wherein:

FIG. 2 shows a split mould for producing articles in accordance with the process of the invention, with a partial cross sectional view taken along a die and a plunger;

FIG. 3 is a cross section III—III of FIG. 2;

FIG. 3a is an embodiment of the rod member shown in FIG. 3;

FIG. 4 is a longitudinal sectional view of a die mold for the production of hollow articles in accordance with the process of the invention; and FIG. 5 is a longitudinal sectional view of a die mold in which one of the forming surfaces of the die is made movable toward the forming surface of the plunger.

Figure 1:
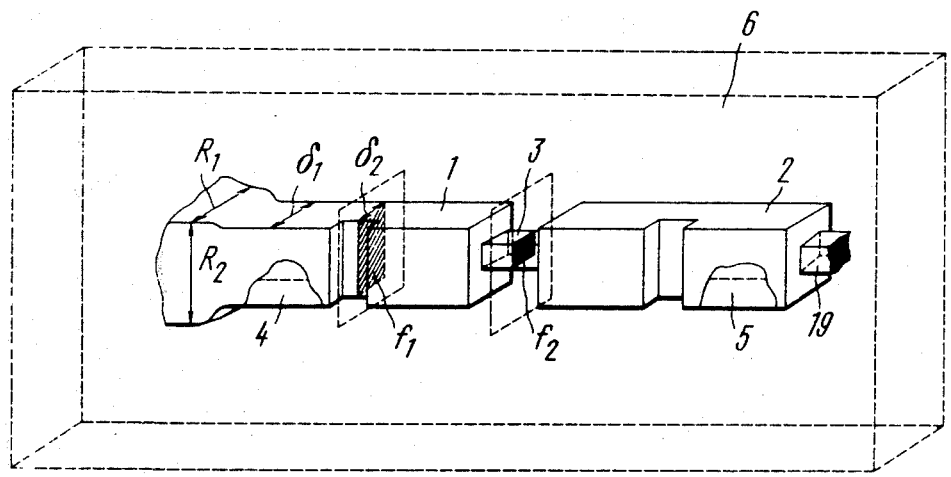
FIG. 1 shows schematically the process molding two articles interconnected by a link member, according to the invention.

The process according to the invention for injection molding of thermoplastics is exemplified by way of describing the production of a molding (FIG. 1) made up of at least two pieces 1 and 2 interconnected by a link member 3. These two items or pieces 1 and 2 are produced strengthened and textured in accordance with the process of the invention as distinct from the prior-art process which permits only the piece 1 to be strengthened while the piece 2 remains unstrengthened.

The following technological operations are used for the production of the strengthened pieces 1 and 2. First, intercommunicating cavities 4 and 5 of a split mold 6 are filled with a polymer melt, then the latter is held under pressure and cooled. As the polymer melt is held under pressure and cooled, it is forced through the cavities 4 and 5 of the split mold 6 at a temperature not exceeding the polymer melting or yield temperature by any more than 40° to 50° C. and under a pressure of 900 to 3,000 kgf/cm$^2$ until the polymer acquires a solid state throughout the volume of the article being produced. The forming surfaces of the mold 6 are cooled within the temperature range between $-20°$ C. and the polymer initial melting or yield temperature. With an increase in pressure, the flow area of the outlet opening, communicating the cavities 4 and 5 of the mold 6, is decreased and the temperature of the mold surfaces is raised within the aforementioned temperature range.

The following factors are taken into account to ensure effective production of thermoplastic items. For example, if the polymer melt is forced through under a pressure of 900 to 1,400 kgf/cm$^2$, then the mold surfaces are cooled down to a temperature ranging from $-20°$ C. to $+60°$ C.

To prevent solidification of the polymer featuring narrow interval of the melting and yield temperature during its passage from one cavity to another through an opening or a channel intercommunicating these cavities, the melt is additionally heated at the places of its transition from one cavity to another.

As the melt is pressed through the cavities 4 and 5, at least one of the forming surfaces of the mold, shown in FIGS. 2 and 3, can be displaced by force in the direction of the polymer flow until the polymer acquires a solid state throughout the volume of the molding being produced.

The polymer melt can be forced through the cavities for example, either by advancing the screw conveyer of an injection-molding machine or by bringing together the forming surfaces of the split mold, such as shown in FIG. 5, with the dimension of the prefilled mold cavities being 1.5 to 3 times that of finished items. Simultaneously, an excessive amount of the material is pressed out from the cavities in question. Also, the mold surfaces are brought together before the polymer acquires a solid state throughout the volume of the item being produced.

The polymer melt is effectively forced through the cavities 4 and 5 of the split mold 6 (FIG. 1), in a manner similar to that described in relation to the split molds shown in FIGS. 2, 4 and 5, with the ratio of the inlet opening flow area $R_1$ and $R_2$ to the maximum distances between the forming surfaces of the cavity 4 being 0.2 to 4, and with the ratio of the cavity outlet flow area $f_2$ to the cross section $f_1$ of the cavity 4 at the place of minimum distance between the forming surfaces in the direction normal to the polymer flow being 0.01 to 1. The size of the flow area $R_1$ and $R_2$ of the inlet opening of the cavity 4 is determined by an equation taken from the theory non-stationary thermal conductivity: $(1/R^2)=(1/R_1^2)+(1/R_2^2)$, or by any known relationship depending on the shape of the inlet opening.

The process of the invention is carried into effect by means of a split mold whose various structural embodiments are shown in FIGS. 2, 4 and 5.

The split mold, such as shown in FIG. 2, comprises a cover half-mold 7 and an ejector half-mold 8 attached respectively to a fixed plate 9 and a movable plate 10 of an injection-molding machine and carrying respectively a die 11 and a die 12. With the half-molds brought together, the forming surfaces A and B of the die 11 and the die 12, respectively, define cavities 13 and 14 depending on the number of items 15 and 16 to be produced. The cavities 13 and 14 intercommunicate via an opening 17 (or a channel) through which the polymer melt passes as it is pressed out from the cavity 13 into the cavity 14. The opening 17 serves as an outlet for the cavity 13 and as an inlet for cavity 14.

The cavity 13 is brought in communication with a gating system by means of an inlet opening 18. The cavity 14 has an outlet opening (not shown) through which passes the polymer melt as it is forced through the cavity 14.

The cavity 14 is formed with an outlet opening only in case when two strengthened articles are to be produced in the split mold. Then, the second piece of the molding will have a section 19 (FIG. 1) of the solidified polymer in this outlet opening, which is then removed.

If, however, the cavity 14 (FIG. 2) is used for producing a strengthened piece by a conventional technique, the provision of an outlet in this cavity will be unneccessary.

To ensure additional or local heating of the walls of the inlet and outlet openings, that is at the places where the polymer melt leaves one cavity for another or passes from the gating system into the cavity 13, the force plunger 12 is respectively provided with replaceable inserts 20 and 21 having heaters 22 made, for example, in the form of cylindrical electric heaters of any conventional type. The replaceable inserts 20 and 21 are isolated from the remaining part of the respective half-mold by means of heat-insulating pads 23 intended for altering the flow area of openings.

The split molds, shown in FIGS. 2, 4 and 5 are equipped with conventional temperature transducers (not shown) which are located in proximity to the forming surfaces.

The melt is fed from an injection-molding machine equipped with pressure and temperature transducers. The half-molds are formed with coolant supply channels provided to cool the forming surfaces to a temperature ranging from $-20°$ C. to $+30°$ C. A cooling plant of any conventional type may be used as the coolant supply source; an oil thermostat will be required for temperatures over $+30°$ C.

To reduce the heat losses, heat-insulating plates 26 fabricated, for example, from asbestos cement are respectively placed between the die 11 and a flange 24 and between the die 12 and a support plate 25.

The temperature of the melt at the entrance to the mold is controlled by means of a temperature transducer to an accuracy of $\pm 1°$ and is regulated with the aid of thermoregulators incorporated in an injection-molding machine. The time for holding the melt under pressure is determined experimentally depending on the molding weight and corresponds to the time indicating that no further growth takes place in the molding weight.

The gating system of the mold may have central and delivery gate runners or a hot-runner system for the admission of the polymer melt with a temperature exceeding by $40°$ to $50°$ C. the polymer melting or yield temperature. Where an unheated gating system is used, the central and delivery gate runners are made to have the size $R_i$ of the flow area equal or greater than the corresponding sizes $R_1$ and $R_2$ of the inlet opening. This being done to prevent the material from solidifying earlier than in the inlet opening and in the mold cavities 4 and 5. To this end, the ratio of the inlet opening size to a maximum distance $\delta_1$ between the forming surfaces is set as 1 to 4.

The provision of heaters (hot-runner gating system) permit the temperature in the gate runners, up the mold cavity 4, to be maintained close to the polymer melting or yield temperature. This, in turn, allows for the inlet opening to function throughout the process during which the polymer melt is forced through the mold cavities 4 and 5. In this way it becomes possible to decrease the flow area of the gate runners, with the ratio of the inlet opening size to a maximum distance $\delta_1$ between the forming surfaces being 0.2 to 1.

In the die mold shown in FIG. 2, the cover half-mold 7, with the exception of the die 11, has an elongated rod member 27 which in cross section is shaped as shwon in FIG. 3 and 3a. In turn, the die 11 has a channel 28 extending lengthwise of the die cavities 13, 14 and opened from the side of these cavities. Mounted for reciprocation in the channel 28 is an elongated rod member 27 having its outer surface, facing the cavity, made as a forming surface A having a longitudinally extending depression adapted to be filled with the melt in the process of molding.

The reciprocating motion of the rod member 27 is provided by an actuator of any conventional type, for example, a hydraulic cylinder, which is fixed to the plate 9 by means of a bracket 30. The rod member 27 has one of its ends connected to the actuator 29 by means of a coupling 31.

The free end of the rod member 27 has a projection 32 provided to engage the layer of the polymer material being cooled, so as to displace the latter relative to the unsolidified layer of the melt.

The items or pieces 15 and 16, for example, in the form of a blade having 3 mm in thickness, and a bar 3 mm thick and 11 mm wide, are produced in the split mould, such as shown in FIG. 2, in the following manner.

The melt of a thermoplastic material is fed under pressure at a temperature exceeding the polymer initial melting or yield temperature by 40° to 50° C. during a single stroke of a worm feeder or an injection-molding machine plunger. The melt is passed through a central gate runner or through a delivery runner and the inlet opening 18 (or a hot-runner inlet) into the cavity 13, the first as viewed in the direction of the polymer flow, wherein the piece 15 or a blade is to be formed. After the cavity 13 is completely filled with the polymer melt, the latter is then forced through the cavity 13 and the heated opening 17 into the second cavity 14 intended for molding the piece 14 in the form of a bar.

The polymer melt continues to be forced through the cavities 13 and 14 until the polymer acquires a solid state throughout the volume of the pieces 15 and 16, which state is controlled, for example, by a discontinued movement of the worm feeder, whereupon a finished product (molding) is removed from the mold. An accurate control over the travelling path and velocity of the worm feeder can be effected by a slide-wire gauge. As the melt is forced through, the rod member 27 is concurrently displaced in the direction of the material flow under the action of a hydraulic cylinder. Since the external surface of the rod member 27 serves as the forming surface A, the forced displacement of one of the forming surfaces, carried out simultaneously with the melt forcing-through operation, permits the thermoplastic material to be additionally sheared and, consequently, to be oriented over the molding cross-section in the cavities 13 and 14 in the direction of the material flow.

The gating system of the die mold is designed to permit the molding cooling time to be determined by a degree of the molding strength and not by the extent of freezing of the inlet opening 18, as is the case in conventional processes. This is ensured by appropriate dimensions of the central gate, i.e. the inlet opening 18, which are made greater (by four times) or equal to the maximum distance between the forming surfaces or to the molding width, such as shown in FIG. 1. Hence, proper conditions for the flow of the polymer melt will exist as long as the free cross-sectional area is preserved in the strengthened item for the polymer to be forced through.

The above holds true for the cold-runner gating system, whereas in the case of a hot-runner system, heat conditions for the polymer flow are provided by additional heaters arranged around the openings or gate runners. Therefore, the dimensions of the inlet opening are reduced, with the ratio of the inlet opening flow area to the distance between the forming surfaces of the cavity in communication with the hot-runner gating system being 0.2 to 1.

Since the process of the invention is carried out at low temperatures of the polymer melt (exceeding by not more than 40° to 50° C. the initial melting temperature for crystallizable thermoplasts or the initial yield temperature for amorphous thermoplasts, and under high casting pressures ensuring high viscosity and low flowability of the melt, the molding pressure is established such as to exceed by 1,000 kgf/cm$^2$ that used in conventional processes. It has been found that the the highest degree of strength in the articles being produced is achieved when the molding pressure is increased with a decrease in the cross-sectional area of the outlet opening 17 adapted to communicate the cavity 13 with the cavity 14.

The die mold, shown in FIG. 4, is intended for the production of strengthened hollow moldings. It comprises a top half-mold 33 and a bottom half-mold 34, which are attached to plates 35 of an injection-molding machine and which carry respectively a die 36 and a die 37. When brought together, the die 36 and the die 37 form two cavities 38 and 39 communicating with each other and with a gating system through an outlet opening 40 and an inlet opening 41.

Mounted for rotation in the mold cavities 38 and 39 arranged coaxially therewith is a forming mandrel 42 connected with an actuator 43 and a device 44 for removing finished moldings 45 and 46.

The top half-mold 33 and the bottom half-mold 34 incorporate heat insulating plates 47, support plates 48 and flanges 49, which are respectively connected in series with the die 36 and the die 37.

The movable forming mandrel 42 is rigidly connected with a crosspiece 50 secured on the fixed part of an injection-molding machine (not shown). The actuator 43 is made, for example, in the form of a hydraulic cylinder with a shaft 51 having a pinion (not shown) mounted on its end for engagement with a gear wheel 52 fitted on the mandrel 42.

The device 44 for removing the moldings 45 and 46 includes a thrust member made in the form of a washer 53 connected with the half-molds 33 and 34 by means of a lever mechanism 54. The lever mechanism 54 incorporates levers 55 articulated through one end to the washer 53 and through another one to levers 56 which are pivotally connected to the support plates 48 of the top and bottom half-molds 33 and 34 and to the crosspiece 50.

The washer 53 is mounted for reciprocation on the mandrel 42 and, with the half-molds 33 and 34 brought apart, is thrust up against the end face of the molding 46, thereby displacing the moldings 45 and 46 relative to the mandrel 42.

The die 36 and the die 37 have replaceable inserts 57 intended for adjusting the flow area of the outlet opening 40. The inserts 57 are provided with heaters 58 and are isolated from the die 36 and die 37 by means of heat-insulating pads 59. To provide additional heating of the walls of the inlet opening 41, there are provided heaters 58 of any conventional type, uniformly arranged around the inlet opening 41.

To enable cooling of the mandrel 42, the latter has holes drilled therein in longitudinal direction to permit the passage of a coolant, and communicating with a coolant supply means 60.

The control of temperature of the die 36 and die 37 is effected by means of a potentiometer of any conventional type, which operable to register and record signals from temperature transducers set in different places of the mold.

This embodiment of the die mold operates as follows.

During one stroke of a worm feeder or the plunger of an injection-molding machine, the polymer melt is fed under pressure at a temperature exceeding by not more than 40° to 50° C. the polymer melting or yield temperature. The melt is charged through the inlet opening 41 into the mold cavity 38, the first as viewed in the direction of the polymer flow. Once the mold cavity 38 is filled with the melt, the level of which is controlled by a thermocouple set at the end of the cavity 38, the melt is then forced through the cavity 38 and the heated outlet opening 40 to pass into the second cavity 39. As the melt is pressed through the cavity, the forming mandrel 42 is concurrently rotated until the material acquires a solid state throughout the volume of the molding being produced. The solidification process is completed when rotation of the forming mandrel 42 or movement of the worm feeder or the injection-molding machine plunger are discontinued. The resultant moldings feature strengthened and textured structure extending both in the direction of the melt flow and radially, which is extremely important for such items as coupling for use in pipelines.

The technique of forcing the polymer melt, through the mold by bringing together the mold surfaces, is exemplified by means of a die mold, such as shown in FIG. 5.

This type of mold is used for the production of strengthened items, such as plates, bars and other bodies. It comprises a top half-mold 61 and a bottom half-mold 62, which are attached to plates 63 of an injection-molding machine. Mounted in the half-molds 61 and 62 are respectively a for plunger 64 and a die 65 which, when brought together, form two cavities 66 and 67 communicating with each other and with a gating system through an outlet opening 68 and an inlet opening 69.

The top half-mold 61 and the bottom half-mold 62 incorporate heat-insulating plates 70, support plates 71 and flanges 72, which are connected in series with the die 64 and the die 65.

Located at the outlet opening 68 in the support plate 71 of the die 65 is a valve device 73 intended for closing or opening the outlet opening 68. The valve device 73 consists of a hydraulic cylinder 74 with a piston having a rod 75 connected to a gate 76 mounted for reciprocation in a shaped hole of the die 64.

The support plate 71 of the bottom half-mold 62 has a blind hole adapted to accommodate a piston 77 of a power cylinder with a rod made as a movable member 78 sliding toward the forming surface E of the die 64 and carrying the forming surface C of the die 65. The movable member 78 comes into intimate contact with the forming surface D of the die 65 over a sliding seat. The support plate 71 has holes 79 and 80 for supply and discharge of a working fluid of the power cylinder.

The flow area of the outlet opening 68 is adjusted by means of replaceable inserts 81 placed in the die 65 and provided with conventional heaters 82. The inserts 81 are isolated from the die 65 by means of heat insulating pads 83. Additional heating of the inlet opening 69 is effected with the aid of heaters 84 arranged uniformly around the opening 69.

The cooling of the movable member 78 of the piston 77 is effected by means of additional channels 84 connected to a coolant supply distribution system (not shown). To reduce heat losses, the movable member 78 the piston 77 is made up of at least two parts with a heat-insulating plate 85 positioned therebetween. This plate can be made of any suitable material, for example, asbestos cement.

The control of temperature of the die 64 and the die 65 is effected by means of a conventional potentiometer.

This die mold operates as in a manner similar to that of the above-described molds with the exception that the polymer melt is injected into the mold cavity, the initial volume of which is 1.5 to 3 times that of the molding. Then, after the cavity 66 is filled, the piston 77 is actuated to displace the member 78, carrying the forming surface C of the half-mold 62, toward another forming surface E until the molding being produced acquires a pressed thickness and a solid state over the entire volume thereof. As this happens, the excessive polymer melt is pressed out of the cavity 66 into the cavity 67 by means of the valve device 73 operable to open the outlet 68, or through the inlet 69 into the cylinder of an injection-molding machine.

The illustrative examples for carrying out the process of the invention and destruction tests for the moldings produced by the prior-art process and by the process according to the present invention are give in Tables 1 to 3.

TABLE 1

HIGH-DENSITY POLYETHYLENE

| Molding Pressure, kgf/cm² | Temperature of Melt, °C. | | | | | | | | | Flow Area of Inlet Opening (mm²) for Standard Specimens 3 mm thick |
|---|---|---|---|---|---|---|---|---|---|---|
| | 125 | | 150 | | | | 175 | | | |
| | Temperature of the Mold Cavity Wall, °C. | | | | | | | | | |
| 1 | 2 | 3 | 4 | 5 | 6 | 7 | 8 | 9 | 10 | 11 |
| 900 | +15 | +20 | +30 | +10 | +20 | +25 | — | +20 | — | |
| | 235 | 240 | 238 | 225 | 230 | 228 | — | 220 | — | 0 |
| | 720 | 850 | 720 | 690 | 790 | 680 | — | 670 | — | 0,7 |
| | 730 | 960 | 725 | 680 | 950 | 680 | — | 780 | — | 0,9 |
| | 730 | 1000 | 730 | 690 | 980 | 690 | — | 850 | — | 1,2 |
| | 720 | 820 | 720 | 690 | 800 | 690 | — | 750 | — | 2,0 |
| 1200 | −15 | +20 | +45 | −10 | +20 | +40 | +15 | +20 | +25 | |
| | 255 | 260 | 250 | 245 | 250 | 240 | 235 | 245 | 235 | 0 |
| | 780 | 880 | 790 | 750 | 850 | 750 | 730 | 780 | 730 | 0,5 |
| | 780 | 1250 | 790 | 750 | 1150 | 750 | 735 | 990 | 740 | 0,9 |
| | 800 | 1280 | 800 | 760 | 1230 | 760 | 735 | 1080 | 735 | 1,0 |
| | 780 | 1020 | 780 | 760 | 1010 | 750 | 740 | 780 | 730 | 2,0 |
| 1400 | −20 | +20 | +60 | −20 | +60 | +60 | −10 | +20 | +50 | |
| | 300 | 305 | 290 | 280 | 300 | 295 | 260 | 270 | 250 | 0 |
| | 915 | 1150 | 920 | 890 | 1080 | 900 | 800 | 850 | 800 | 0,4 |
| | 920 | 1550 | 920 | 900 | 1500 | 900 | 880 | 1200 | 880 | 0,9 |

TABLE 1-continued
HIGH-DENSITY POLYETHYLENE

| Molding Pressure, kgf/cm² | Temperature of Melt, °C. | | | | | | | | | Flow Area of Inlet Opening (mm²) for Standard Specimens 3 mm thick |
|---|---|---|---|---|---|---|---|---|---|---|
| | 125 | | | 150 | | | 175 | | | |
| | Temperature of the Mold Cavity Wall, °C. | | | | | | | | | |
| 1 | 2 | 3 | 4 | 5 | 6 | 7 | 8 | 9 | 10 | 11 |
| | 910 | 1220 | 920 | 900 | 1200 | 900 | 800 | 1010 | 800 | 2,0 |
| 3000 | −20 | +20 | +105 | −20 | +20 | +115 | −20 | +20 | +125 | |
| | 450 | 610 | 430 | 420 | 600 | 410 | 390 | 540 | 370 | 0 |
| | 1200 | 1500 | 1200 | 1200 | 1400 | 1200 | 1000 | 1100 | 1000 | 0,2 |
| | 1200 | 2000 | 1200 | 1200 | 2000 | 1200 | 1100 | 1500 | 1100 | 0,5 |
| | 1200 | 1600 | 1200 | 1200 | 1500 | 1200 | 1000 | 1300 | 1000 | 0,8 |

TABLE 2
PROPYLENE

| Molding Pressure, kgf/cm² | Temperature of Melt, °C. | | | | | | | | | Flow Area of Inlet Opening (mm²) for Standard Specimens 3 mm thick |
|---|---|---|---|---|---|---|---|---|---|---|
| | 160 | | | 180 | | | 200 | | | |
| | Temperature of the Mold Cavity Wall, °C. | | | | | | | | | |
| 900 | +20 | +20 | +25 | +10 | +20 | +35 | +15 | +20 | +25 | |
| | 260 | 280 | 300 | 240 | 250 | 260 | 235 | 240 | 235 | 0 |
| | 400 | 550 | 400 | 400 | 500 | 400 | 350 | 400 | 400 | 0,7 |
| | 400 | 600 | 450 | 400 | 600 | 400 | 350 | 400 | 400 | 0,9 |
| | 400 | 800 | 500 | 400 | 700 | 400 | 350 | 600 | 400 | 1,2 |
| | 400 | 700 | 500 | 400 | 600 | 400 | 350 | 450 | 400 | 2,0 |
| 1200 | −15 | +20 | +45 | −10 | +20 | +40 | +10 | +20 | +30 | |
| | 280 | 310 | 350 | 260 | 290 | 320 | 250 | 260 | 270 | 0 |
| | 450 | 600 | 500 | 400 | 550 | 500 | 400 | 500 | 400 | 0,5 |
| | 450 | 800 | 500 | 500 | 700 | 500 | 400 | 550 | 400 | 0,9 |
| | 450 | 900 | 550 | 600 | 800 | 500 | 400 | 650 | 400 | 1,0 |
| | 450 | 700 | 500 | 550 | 650 | 500 | 400 | 570 | 400 | 2,0 |
| 1400 | −20 | +20 | +60 | −20 | +20 | +60 | −10 | +20 | +50 | |
| | 350 | 380 | 400 | 370 | 400 | 290 | 310 | 350 | 290 | 0 |
| | 590 | 1040 | 650 | 650 | 910 | 620 | 520 | 720 | 520 | 0,4 |
| | 590 | 1200 | 720 | 780 | 1040 | 630 | 540 | 850 | 530 | 0,9 |
| | 590 | 910 | 650 | 720 | 850 | 620 | 520 | 740 | 520 | 2,0 |
| 3000 | −20 | +20 | +140 | −20 | +20 | +150 | −20 | +20 | +60 | |
| | 530 | 760 | 600 | 510 | 740 | 600 | 440 | 620 | 520 | 0 |
| | 770 | 1400 | 850 | 850 | 1200 | 800 | 680 | 930 | 680 | 0,2 |
| | 770 | 1600 | 930 | 1010 | 1400 | 820 | 700 | 1100 | 700 | 0,5 |
| | 770 | 1200 | 850 | 930 | 1100 | 800 | 680 | 960 | 680 | 0,8 |

TABLE 3
POLYAMIDE

| Molding Pressure kgf/cm² | Temperature of Melt, °C. | | | | | | | | | Flow Area of Inlet Opening (mm²) for Standard Specimens 3 mm thick |
|---|---|---|---|---|---|---|---|---|---|---|
| | 180 | | | 190 | | | 200 | | | |
| | Temperature of the Mold Cavity Wall, °C. | | | | | | | | | |
| 900 | +5 | +20 | +35 | +10 | +20 | +30 | +15 | +20 | +25 | |
| | 310 | 330 | 290 | 320 | 350 | 300 | 330 | 360 | 320 | 0 |
| | 450 | 770 | 440 | 430 | 710 | 420 | 400 | 600 | 400 | 0,7 |
| | 530 | 840 | 470 | 490 | 750 | 460 | 420 | 670 | 420 | ₋0,9 |
| | 420 | 720 | 410 | 420 | 700 | 400 | 400 | 600 | 400 | 1,2 |
| | 400 | 650 | 380 | 380 | 600 | 370 | 390 | 530 | 390 | 2,0 |
| 1200 | 0 | +20 | +40 | +5 | +20 | +35 | +10 | +20 | +30 | |
| | 320 | 340 | 300 | 340 | 360 | 310 | 350 | 380 | 330 | 0 |
| | 600 | 920 | 570 | 560 | 850 | 510 | 490 | 770 | 440 | 0,5 |
| | 560 | 860 | 530 | 500 | 800 | 470 | 440 | 720 | 430 | 0,9 |
| | 500 | 820 | 490 | 490 | 760 | 450 | 400 | 660 | 400 | 1,0 |
| | 470 | 760 | 420 | 430 | 720 | 400 | 400 | 540 | 380 | 2,0 |
| 1400 | −10 | +20 | +50 | 0 | +20 | +40 | +5 | +20 | +35 | |
| | 330 | 350 | 310 | 350 | 380 | 320 | 370 | 400 | 310 | 0 |
| | 780 | 1200 | 740 | 730 | 1110 | 660 | 640 | 1000 | 570 | 0,4 |
| | 730 | 1120 | 690 | 650 | 1040 | 610 | 570 | 940 | 560 | 0,9 |
| | 650 | 1070 | 640 | 640 | 990 | 590 | 520 | 860 | 520 | 2,0 |
| 3000 | −20 | +20 | +160 | −20 | +20 | +170 | −20 | +20 | +180 | |
| | 360 | 400 | 340 | 380 | 430 | 350 | 400 | 450 | 340 | 0 |

TABLE 3-continued

POLYAMIDE

| Molding Pressure kgf/cm² | Temperature of Melt, °C. | | | | | | | | | Flow Area of Inlet Opening (mm²) for Standard Specimens 3 mm thick |
|---|---|---|---|---|---|---|---|---|---|---|
| | 180 | | | 190 | | | 200 | | | |
| | Temperature of the Mold Cavity Wall, °C. | | | | | | | | | |
| | 1010 | 1550 | 960 | 950 | 1450 | 860 | 830 | 1300 | 740 | 0,2 |
| | 950 | 1450 | 900 | 850 | 1350 | 800 | 740 | 1220 | 730 | 0,5 |
| | 850 | 1390 | 830 | 830 | 1280 | 760 | 680 | 1120 | 680 | 0,8 |

From the above it follows that with the process of the invention it becomes possible to increase the strength of polymer in the molding 3 to 5 times and over by producing directionally oriented structure of the material; to expand the mold cooling temperature range along with an increase in the molding pressure while ensuring a required strength properties of the molding material; to improve physical and mechanical properties of thermoplastic materials and to widen the scope of their application; to replace expensive and scarce polymer materials by cheap ones, such as polyethyelene styrene copolymer, etc.

What is claimed is:

1. A split mold of an injection-molding machine, comprising two half-molds mounted on plates of the injection-molding machine; coolant supply channels formed in said half-molds; a first die incorporated in one of the half-molds and having forming surfaces; a second die incorporated in the other half-mold and having forming surfaces; a gating system for feeding the polymer melt; cavities defined by the forming surfaces when the half-molds are brought together, said cavities communicating with each other and with the gating system; openings of said cavities, adapted to communicate the cavities with each other and with the gating system, the openings disposed at the entrance of the melt into the cavity serving as inlets and those disposed at the exit of the melt from the cavity as outlets; conventional heaters mounted in said first and second die at the inlet and outlet openings; replaceable inserts positioned at the outlet openings of the cavity to alter the flow area of these openings.

2. A split mold as claimed in claim 1, wherein the die cavity, at least the first as viewed in the direction of the polymer flow, has a channel extending throughout its length and opened from the side of the cavity; an elongated rod member mounted in said channel for reciprocation; means for reciprocating said rod member, connected with one of its ends; a projection formed on the other end of said elongated rod member, the latter having its external surface, presented to the cavity, functioning as a forming surface; a depression made in the forming surface of the rod member lengthwise thereof.

3. A split mold as claimed in claim 1, wherein in the course of producing hollow moldings a forming mandrel is rotatably positioned in the cavities of said half-molds and is arranged coaxially therewith; a conventional actuator intended for rotating said forming mandrel; a movable rod member mounted on said forming mandrel; a lever mechanism adapted to connect said thrust member with said half-molds.

4. A split mold as claimed in claim 1, wherein at least one of the forming surfaces of said first or second die is made movable in the direction of another forming surface so as to alter the volume of the cavity they form; a conventional valve device arranged in close proximity with the outlet opening and adapted to close the latter when required.

* * * * *